UNITED STATES PATENT OFFICE 2,352,097

PRODUCTION OF ORGANIC COMPOUNDS CONTAINING SULPHUR, CHLORINE, AND OXYGEN

Paul Herold, Karl Smeykal, Friedrich Asinger, and Wilhelm Wolf, Leuna, Germany, assignors, by mesne assignments, to General Aniline & Film Corporation, New York, N. Y., a corporation of Delaware No Drawing. Application August 30, 1938, Serial No. 227,510. In Germany September 2, 1937

4 Claims. (Cl. 204—162)

The present invention relates to a process for the production of organic compounds containing sulphur, chlorine and oxygen.

We have found that industrially valuable compounds containing sulphur, chlorine and oxygen can be obtained by bringing into contact saturated aliphatic or cycloaliphatic hydrocarbons (in the following defined as paraffinic hydrocarbons) with sulphur dioxide and chlorine in the liquid phase while irradiating with short-waved light. The compounds thus obtained contain a preponderating amount of chlorine in an easily saponifiable form; they show the properties of sulphonic acid halides.

As starting materials for our process there may be mentioned all kinds of paraffin waxes, petroleum and their hydrogenation products and also hydrogenation products of coals and tars, also such compounds which contain in addition to paraffinic hydrocarbons hydrocarbons of unsaturated nature. Starting materials rich in paraffinic hydrocarbons are especially suitable. Pure straight-chain or branched paraffinic hydrocarbons or oils consisting mainly of the same are eminently suitable.

The source of the starting materials used is immaterial. For example, paraffinic hydrocarbons found in natural products may be used or one may use the hydrocarbons obtained by catalytic hydrogenation of the oxides of carbon which have been freed from unsaturated and oxygen-containing compounds admixed therewith by further hydrogenation. Suitable starting materials are the dehydration products of oxygen compounds obtained in the catalytic hydrogenation of oxides of carbon or the polymerization products obtained from these dehydration products which have been converted into saturated hydrocarbons by hydrogenation. There may be used hydrocarbons obtained by catalytic hydrogenation of oxides of carbon under normal or slightly increased pressure which have been purified by another method than hydrogenation, for example, by treatment with concentrated sulphuric acid or with liquid sulphur dioxide or by extraction with liquid solvents, having a selective action.

Further starting materials are cyclic saturated hydrocarbons, especially those having long saturated aliphatic side-chains, as for example mono- and dibutyldecahydronaphthalene and dodecylcyclohexane etc.

Our process may be carried out in practice for example by leading a gaseous mixture of sulphur dioxide and chlorine through suitable dispersal means, for example a filter-nozzle, near the bottom of a vessel of enamelled iron, stoneware or another keramic material which is filled with the liquid or liquefied starting hydrocarbon. Sulphur dioxide and chlorine may also be led into the reaction vessel simultaneously at various points. During the reaction, the liquid is preferably moved by stirring. The short-wave light is allowed to irradiate into the reaction chamber through a window permeable to short-wave light, as for example quartz windows. The short-wave light serving for the irradiation may be produced by mercury vapor lamps, electric arcs or other suitable sources of light. The rays may also be produced within the liquid with the aid of immersion lamps. It is preferable to use sources of light the greatest intensity of which lies in the wave-region over 1800, preferably over 2200, and below 5000 Angstrom-units. When using rays having too short a wave-range, there sometimes occurs to a small extent decomposition of the hydrocarbons which gives rise to a blackening of the immersed lamp or of the window through which irradiation is effected. It is preferable to absorb the rays having a wave-length below 1800 Angstrom-units by means of suitable filters.

If paraffinic hydrocarbons are used as starting materials which are liquid under normal or reaction conditions, there exists no need for carrying out the reaction in the presence of a solvent. However, it is preferable to work with an addition of solvents immune to attack such as chloroform or carbon tetrachloride, when starting from solid hydrocarbons, for example hard paraffin wax. When starting from paraffinic hydrocarbons which are gaseous or easily volatile under normal conditions, for example ethane, propane, butanes up to octanes, it is also preferable to work in the presence of such a solvent.

The reaction begins as soon as the irradiation commences without it being necessary to supply heat externally. The reaction may even be initiated, when the starting materials have been previously cooled. Generally speaking, temperatures of more than 60° C. should be avoided, especially if starting from lower molecular weight paraffinic hydrocarbons. The reaction may also be carried out under increased pressure.

The progress of the reaction may readily be followed by withdrawing samples from the reaction vessel and carrying out a quantitative determination of the hydrolysable chlorine by saponification with an aqueous alkali solution. Depending on the amount of chlorine and sulphur dioxide, compounds are obtained which contain one or more radicles of sulphonic acid halides in the molecule. Care may be taken that one or another desired final product is mainly formed depending on the reaction conditions, particularly the ratio of the starting materials. When an excess of chlorine in relation to sulphur dioxide is used, the fraction of halogenated sulphonic acid halides and in some cases also of halogenated hydrocarbons is increased. In order to obtain sulphonic acid halides which are substantially free from difficultly hydrolysable chlorine, it is, therefore, preferable to use the same amount or a slight excess of sulphur dioxide in relation to chlorine. An excess of the hydrocarbon as compared with sulphur dioxide and chlorine favors the formation of monosulphonic acid halides. On the other hand, if only one molecular proportion of hydrocarbon or less be used for each molecular proportion of sulphur dioxide and chlorine, compounds are obtained containing more than one sulphonic acid halide group. When the reaction is completed, the reaction mixture is freed from dissolved halogen hydride, for example by applying a vacuum or by washing with water. If necessary, the solvent used may be first evaporated and used again if desired. From the residue of the sulphonic acid halides may be isolated by distillation or by cooling or crystallization in stages. They may then be purified by the usual methods, as for example by recrystallization from solvents, such as benzene, chloroform or carbon tetrachloride. When the disulphonic acid halides have been separated, the monosulphonic acid halides may be returned to the starting mixture and also converted into disulphonic acid halides. Purifying and working up of the reaction mixture may be entirely dispensed with and the crude sulphonic acid halides may at once be used for further reactions.

It has already been proposed to treat in the liquid phase hydocarbons, such as paraffin wax, illumination oils, lubricating oils and the like with halogen and sulphur, selenium or tellurium dioxide. The products obtained contain part of the halogen bound in easily hydrolysable form; they may be considered as halides of esters of sulphurous acid. These compounds are always distinguished by a rather high content of difficultly hydrolysable halogen. In other words, they contain halogen as a simple substituent, so that after saponifying the hydrolysable halogen-containing saponification products are obtained which during concentration easily split off hydrogen chloride according to the amount of chlorine directly combined with carbon, unsaturated compounds thus being formed which give rise to decomposition. Furthermore, a very long action of the agents, as for example chlorine and sulphur dioxide, is usually necessary, when working according to the known process, even if working in diffuse day-light, in order to obtain a sufficiently far-reaching halogenation. Waste gases are obtained which always contain considerable amounts of unchanged halogen and sulphuryl halide formed as by-product. In contrast thereto, the chlorine is rapidly absorbed, when working according to our invention, and products are obtained being substantially free from difficultly hydrolysable halogen or containing only small amounts thereof.

The following examples will further illustrate the nature of this invention but the invention is not restricted to these examples. The parts are by weight, unless otherwise stated.

Example 1

60 litres of an oil of the specific gravity 0.768 (at 20° C.) and boiling between 210° and 370° C. obtained by hydrogenation of carbon monoxide at atmospheric pressure is treated at room temperature with chlorine and sulphur dioxide, the light of a mercury vapor lamp of 700 watts being caused to act through a window permeable to ultra-violet rays. The reaction mixture first becomes saturated with chlorine and sulphur dioxide, thus becoming intense green in color. After about 30 minutes, the reaction commences suddenly with vigorous evolution of hydrogen chloride, the green coloration thus rapidly disappearing. The leading in of the amounts of sulphur dioxide and chlorine necessary for the reaction (2 atoms of chlorine per molecule of initial material calculated from the mean molecular weight of the initial material, of which 1 atom enters into the compound and 1 atom forms hydrogen chloride) requires about 20 hours, the product then being freed from hydrogen chloride and some sulphur dioxide by application of a vacuum.

It contains:

13.4 per cent of total chlorine of which 11.4 per cent are hydrolysable chlorine, and 9.7 per cent of sulphur.

If the same initial material be treated in diffuse daylight under otherwise identical conditions as stated above, 400 hours are necessary for the absorption of only about 6 per cent of hydrolysable chlorine, sulphuryl chloride being formed in an undesirable side-reaction. Only a fraction of the amounts of chlorine and sulphur dioxide led into the reaction liquid are absorbed. The liquid is deep green in color throughout the whole duration of the reaction. The analysis of a product obtained in this way gives the following values:

15.3 per cent of total chlorine of which 6.2 per cent are hydrolysable chlorine, and 5.4 per cent of sulphur.

If the reaction be carried out without the use of short-wave light until there is a content of 13.4 per cent of hydrolysable chlorine (for which a further about 300 hours are necessary even when accelerating the reaction by heating), a final product is obtained containing 32.4 per cent of total chlorine and 11.5 per cent of sulphur.

As starting material there may also be used an oil boiling from 180 to 340° C. (obtained by the hydrogenation of carbon monoxide under atmospheric pressure) which has a density of ($d_{20}$) 0.763, and of which 15 per cent dissolve in sulphuric acid containing phosphorus pentoxide. This oil is hydrogenated before the reaction with sulphur dioxide and chlorine in the presence of a nickel sulfide-tungsten sulfide catalyst at 280° C. under a pressure of 200 atmospheres to form a completely colorless product of which none dissolves in sulphuric acid containing phosphorus pentoxide. The oil purified by hydrogenation, before causing it to react with chlorine and sulphur dioxide, may be separated into fractions, and there may be used, for example, a fraction boiling between 220 and 300° C.

A suitable starting material may also be prepared in the following manner.

From a product obtained by the catalytic pressure hydrogenation of carbon monoxide there is separated by distillation a fraction of the boiling range of 155° to 160° C. which consists mainly of isoheptyl alcohol. By leading it over an aluminum oxide catalyst at 360° C., the fraction is dehydrated. The resulting product (mainly isoheptylene) is polymerized by treatment with 85 per cent sulphuric acid, whereby mainly di-isoheptylene is formed. This is hydrogenated at 270° C. under a pressure of 200 atmospheres in the presence of a catalyst of nickel sulphide and tungsten sulphide in the form of pieces. The product thus formed consists mainly of isotetradecane.

Example 2

An oil having a density of 0.769 (at 20° C.), which boils between 210° and 370° C. and which contains from about 13 to 15 per cent of constituents soluble in phosphorus pentoxide and sulphuric acid (obtained by the hydrogenation of carbon monoxide at ordinary pressure) is treated at room temperature with chlorine and sulphur dioxide (somewhat more than the equi-molecular amount with reference to the chlorine), the light from a mercury vapor lamp of 700 watts being admitted through a window permeable to ultra-violet rays. The leading in of the amounts of sulphur dioxide and chlorine necessary for the reaction (70 parts of chlorine and 70 parts of sulphur dioxide for 220 parts of initial material) requires about 20 hours, the product then being freed from hydrogen chloride and any sulphur dioxide by the application of a vacuum. It contains 15.2 per cent of total chlorine, 11.5 per cent of hydrolysable chlorine and 9.3 per cent of sulphur.

If the same initial material be treated in diffuse daylight under conditions otherwise identical to those given above, a treatment for 400 hours is necessary to produce a product containing about 6 per cent of hydrolysable chlorine; sulphuryl chloride is formed as an undesirable by-product and only a small part of the chlorine and sulphur dioxide led in is absorbed. Analysis of the product thus obtainable gives the values: 16.8 per cent of total chlorine, 6.4 per cent of hydrolysable chlorine and 5.2 per cent of sulphur. If the reaction be carried on until the product contains 13 per cent of hydrolysable chlorine (for which about another 300 hours are necessary even with acceleration of the reaction by heating), a final product is obtained containing 36.3 per cent of total chlorine and 10.8 per cent of sulphur.

A similar result is obtained, if under equal conditions a starting material be used which has been prepared in the following manner.

An oil boiling between 180° and 340° C. obtained by the hydrogenation of carbon monoxide at atmospheric pressure which has a specific gravity of 0.763 at 20° C. and which contains 15 per cent of olefines and compounds containing oxygen, is treated consecutively three times each with 10 per cent of its weight of concentrated commercial sulphuric acid, care being taken for thorough mixing. After this treatment the content of olefines and compounds containing oxygen has disappeared. The product is washed with caustic soda solution and water and if necessary dried.

There may also be used as starting material a fraction boiling from 220 to 300° C. of a product obtainable by the hydrogenation of carbon monoxide under atmospheric pressure which has been purified in the manner usual in the mineral oil industry with liquefied sulphur dioxide moved in counter-current in pressure-vessels to remove unsaturated and oxygen-containing impurities.

Example 3

883 parts of butyldecahydronaphthalene are treated for 3 hours with 150 parts of chlorine and 150 parts of sulphur dioxide per hour at room temperature while irradiating with ultra-violet light. After sucking off the hydrogen chloride and sulphur dioxide in vacuo, a product is obtained which contains 13.5 per cent of total chlorine, 8.6 per cent of hydrolysable chlorine and 4.8 per cent of sulphur.

Without the action of short-wave light, no considerable amount of sulphur enters into the molecule, but products are obtained containing mainly only halogen besides carbon and hydrogen.

Example 4

400 parts of brown coal hard paraffin wax are dissolved in 250 parts of carbon tetrachloride. During the course of 7 hours the amounts of sulphur dioxide and chlorine calculated for the reaction are allowed to act while irradiating with ultra-violet light at room temperature. After distilling off the carbon tetrachloride in vacuo, a product is obtained which contains 23 per cent of total chlorine, 16 per cent of hydrolysable chlorine and 12.3 per cent of sulphur.

By carrying out the same reaction in diffuse daylight, the time required to obtain the same content of hydrolysable chlorine is a multiple of the time required when using short-wave light; there also takes place a displacement of the ratio of total chlorine to hydrolysable chlorine similar to that described in Example 1.

The parts of the following examples are by volume.

Example 5

1000 parts of propane, 950 parts of sulphur dioxide and 920 parts of chlorine are led during 17 hours into 2 parts of carbon tetrachloride. The liquid is irradiated with short-wave light. Care is taken that the temperature does not rise above 15° C. The mixture formed is continually withdrawn and the carbon tetrachloride which is evaporated from the substances formed, is condensed and returned. The mixture obtained is then separated. By heating at atmospheric pressure, the carbon tetrachloride still contained therein is first distilled and then at 17 millimeters (mercury gauge) and 76° C. the propane sulphonic acid chloride and at 1 millimeter and 62° C. a small amount of a chlorine derivative. A propane disulphonic acid chloride remains behind. The propane is converted to the extent of 70 per cent. Of the propane converted, 60 per cent are converted into monosulphonic acid chloride, 30.5 per cent into a disulphonic acid chloride having a melting point of 48° C. and only 1.5 per cent into propane chlorides.

Example 6

320 parts of isobutane, 320 parts of sulphur dioxide and 288 parts of chlorine are led during the course of 8 hours into 2 parts of carbon tetrachloride while irradiating with the light from a carbon arc lamp. By working up as described in Example 5, the monosulphonic acid chloride formed passes over at 52° C. at 1 millimeter pressure. The residue contains mainly disulphonic acid chloride. 74 per cent of the isobutane are converted of which 78 per cent are converted into monosulphonic acid chloride and 22 per cent into disulphonic acid chloride.

Example 7

300 parts of normal butane, 570 parts of sulphur dioxide and 540 parts of chlorine are led into 1 part of carbon tetrachloride during the course of 15 hours while irradiating with short-wave light. The mixture is worked up as described in Example 5. Of the normal butane, 90 per cent are converted of which 85 per cent are converted into disulphonic acid chlorides, 13 per cent into monosulphonic acid chlorides and 2 per cent into chlorinated butanes. The disulphonic acid chlorides may be separated from each other by recrystallization in stages while cooling. There are mainly obtained two compounds melting at 44° and 84° C. which differ in their solubility in benzene, chloroform and carbon tetrachloride.

Example 8

240 parts of ethane, 260 parts of sulphur dioxide and 240 parts of chlorine are led into 1 part of carbon tetrachloride during 10 hours. The liquid is irradiated with the light of a mercury vapor lamp. The final mixture is worked up in the manner described in Example 5. 73 per cent of the ethane are converted, of which 64 per cent are converted into ethane monosulphonic acid chloride boiling at 161° C. at atmospheric pressure, 34 per cent into ethane disulphonic acid chloride and 2 per cent into chlorine derivatives of ethane.

What we claim is:

1. The process for the production of organic sulfonic acid chlorides having from two to eight carbon atoms per molecule and containing a preponderating amount of chlorine in an easily saponifiable form, which comprises dissolving a paraffinic hydrocarbon having from two to eight carbon atoms per molecule in a liquid solvent therefor which is stable to chlorine and sulphur dioxide to thereby form a liquid solution of a paraffinic hydrocarbon having from two to eight carbon atoms per molecule and solvent, and reacting the paraffinic hydrocarbon having from two to eight carbon atoms per molecule in said solution with a mixture of chlorine and sulphur dioxide in which the amount of chlorine used is at most equimolecular to the amount of sulphur dioxide while irradiating the reaction mixture with light consisting essentially of wave lengths between 1800 and 5000 Angstrom units, thereby bringing about the formation of the sulphonic acid chlorides.

2. The process for the production of organic sulfonic acid chlorides containing a preponderating amount of chlorine in an easily saponifiable form, which comprises introducing a normally gaseous hydrocarbon in vapor phase into a normally liquid solvent therefor which is stable to chlorine and sulphur dioxide, introducing a mixture of sulphur dioxide and chlorine in which the amount of chlorine used is at most equimolecular to the amount of sulphur dioxide, and subjecting the thus formed reaction mixture to the action of light consisting essentially of wave lengths between 1800 and 5000 Angstrom units to thereby cause said hydrocarbon to react with said chlorine and sulphur dioxide, thereby bringing about the formation of the sulphonic acid chlorides.

3. The process for the production of a propane sulfonic acid chloride which comprises subjecting a reaction mixture containing propane, carbon tetrachloride, sulfur dioxide and chlorine, in which the amount of chlorine is at most equimolecular to the amount of sulfur dioxide, to the action of light consisting essentially of wave lengths between 1800 and 5000 Angstrom units, thereby bringing about the formation of sulfonic acid chloride.

4. The process for the production of an isobutane sulfonic acid chloride which comprises subjecting a reaction mixture containing isobutane, carbon tetrachloride, sulfur dioxide and chlorine, in which the amount of chlorine is at most equimolecular to the amount of sulfur dioxide, to the action of light consisting essentially of wave lengths between 1800 and 5000 Angstrom units, thereby bringing about the formation of the sulfonic acid chloride.

PAUL HEROLD.
KARL SMEYKAL.
FRIEDRICH ASINGER.
WILHELM WOLF.